Nov. 28, 1933.　　　T. T. GRAY　　　1,937,113
REFINING OF HYDROCARBON PRODUCTS
Filed March 7, 1927

Inventor
Thomas T. Gray
By his Attorneys
Kenyon & Kenyon

Patented Nov. 28, 1933

1,937,113

UNITED STATES PATENT OFFICE 1,937,113

REFINING OF HYDROCARBON PRODUCTS

Thomas T. Gray, Elizabeth, N. J., assignor to The Gray Processes Corporation, Newark, N. J., a corporation of Delaware Application March 7, 1927. Serial No. 173,432

18 Claims. (Cl. 196—28)

This invention relates to the refining of hydrocarbon products and particularly to the refining of products obtained from petroleum contaminated with sulphur.

Such products usually contain certain malodorous sulphur compounds particularly the kind known as mercaptans which cause them to react sour to the doctor test or in other words to discolor and form a precipitate when agitated with sodium plumbite and sulphur. Heretofore these compounds have customarily been removed by a laborious and cumbersome chemical treatment with sodium plumbite in the presence of sulphur or other chemical solution. The hydrocarbon product may also contain sulphur in other forms as well as certain other objectionable compounds or substances; for example, cracked petroleum hydrocarbons usually contain unstable, unsaturated compounds which are objectionable because of their tendency to darken and form gums when exposed to light.

An object of this invention is inexpensively and efficiently to sweeten or desulphirize such product and simultaneously to free said product of other objectionable substances or compounds.

According to this invention, cracked hydrocarbons obtained from petroleum contaminated with sulphur may be desulphurized or sweetened and stabilized by passing such hydrocarbons or that portion thereof which is desired as the final product in vapor phase through a treating substance containing a highly adsorptive material and a material reactive with mercaptans to free the product of its objectionable odor. The treating material may be supported within a tower having a vapor inlet and a vapor outlet in such manner that vapors are caused to contact with the treating material in their passage through the tower. The unstable, unsaturated compounds are polymerized and separated from the vapors by condensation in the treating material while the offensively odorous sulphur compounds or mercaptans are converted into mercaptides which are retained in the treating material or are converted into unobjectionable compounds which pass off with the vapor. This treatment may be carried on at atmospheric pressure but applicant prefers to subject the cracked hydrocarbons to the treating material at superatmospheric pressure as he has discovered by so doing that the yield of stable, sweet product for a given quantity of catalyst is tremendously increased.

Figure 1:
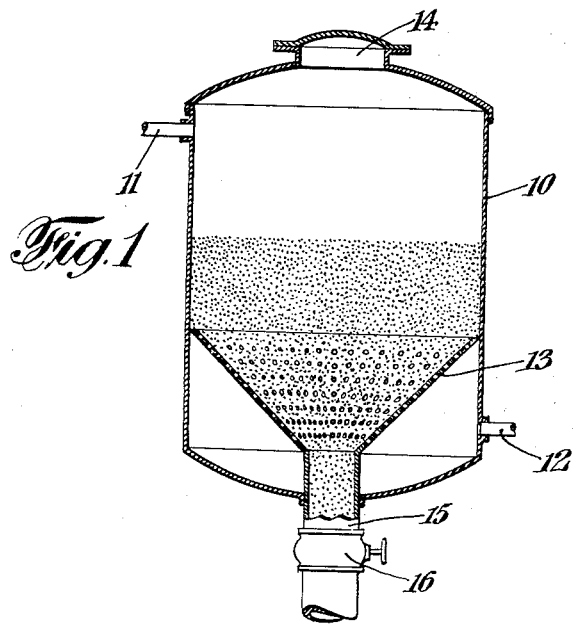
Figure 2:
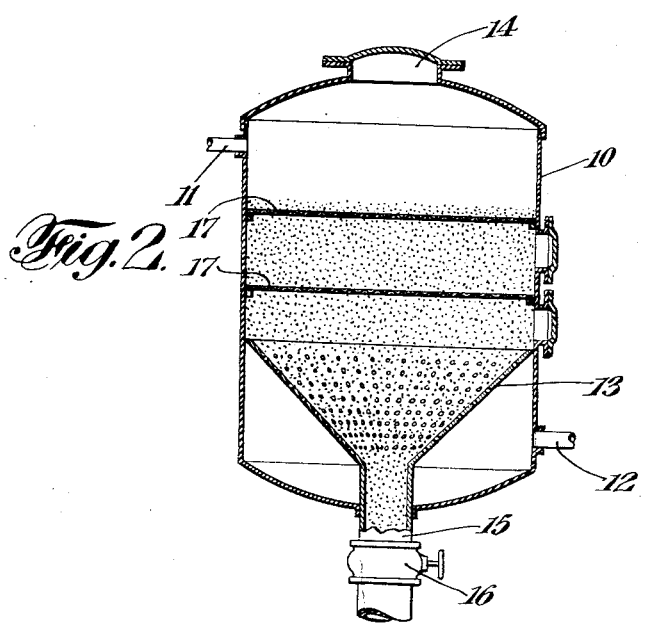

Other objects and novel features and advantages of this invention will be apparent from the following specification and accompanying drawing wherein Fig. 1 discloses one form of apparatus suitable for subjecting the vapor to the treating material and Fig. 2 discloses a modification thereof.

In both figures of the drawing 10 represents a treating tower into which the vapors to be treated are introduced through the pipe 11 and are discharged after treatment through the pipe 12. A perforated shelf 13 is arranged in the tower 10 between the vapor inlet 11 and the vapor outlet 12 upon which is supported the treating material which may be charged into the tower through the manhole 14 and discharged from there through the spout 15 controlled by the valve 16. The treating material is prevented from dropping through the shelf 13 by providing on the shelf a layer of mineral wool or the like so that the shelf is permeable only to fluids. The vapor to be treated passes through the treating material supported on the shelf 13, through the shelf itself and flows out through the pipe 12.

The vapor to be treated may be that of cracked hydrocarbons which contains objectionable unsaturated, unstable compounds and is contaminated with sulphur compounds known as mercaptans which are of an offensive odor or it may be that portion of such hydrocarbons as is desired for the final product, which portion may have been obtained by fractionation in any suitable manner. The vapor may be introduced into the tower directly from a cracking system or from a still in which distillates previously cracked are being rerun. The treating material is made up of a highly absorptive material such for example as fuller's earth and a material reactive with mercaptans to form mercaptides or to convert mercaptans into unobjectionable sulphur compounds. This latter material may be designated as the sweetening or desulphurizing material and preferably comprises copper oxide although metallic copper, copper carbonate, manganese dioxide, leadperoxide, nickel carbonate, ferrous carbonate, copper silicate, copper chromate, cuprous oxide, cadmium oxide and mercuric oxide are other metallic compounds having an affinity for sulphur and which are effective sweetening materials. During the passage of the vapors through the treating material the objectionable unsaturated hydrocarbons are polymerized by contact with the adsorptive material to form compounds having higher boiling points and are removed from the vapors by condensation; the mercaptans are simultaneously either converted into mercaptides which are retained in the treating material or are converted into unobjectionable sulphur compounds which pass out of the tower with the treated vapors.

The treating material may comprise a mixture of the absorptive material and the sweetening or desulphurizing material. This mixture may be obtained by saturating the adsorptive material with a solution of a salt of the sweetening material and subsequently roasting the saturated adsorptive material, thereby converting the salt into an oxide in finely divided condition uniformly distributed throughout the adsorptive material, or the material, after roasting, may be treated in a reducing atmosphere such as hydrogen to cause the formation of a deposit of metal upon the adsorptive material. The use of this treating material results in a product which is stable and of inoffensive odor. Preferably, the adsorptive material is fuller's earth and the sweetening material copper oxide.

The use of an adsorptive material intimately mixed with a sweetening material sometimes is uneconomical because of the fact that, with the proportion of the sweetening material obtainable in the mixture, the sweetening material may become exhausted before the adsorptive material so that the product obtained is no longer sweet. It is then necessary to remove the entire mass of treating material to revitalize it. Good results may be obtained much more economically by passing the vapor to be treated through a body of sweetening material, then through a body of adsorptive material and finally through another body of the sweetening material, preferably mixed with adsorptive material. It is advisable that the vapor be passed through at least part of the sweetening material after its passage through the main portion of the adsorptive material.

To treat the vapors in the manner above described, the treating materials may be arranged within the tower in layers as shown in Fig. 2. Several screens 17 or the like can be provided to keep the layers separate. Preferably, the layer with which the vapor last comes into contact should consist of both the sweetening material and the adsorptive material while the layer with which the vapors contact first may be of the sweetening material alone. The intermediate layer consists merely of the adsorptive material. With this layer arrangement of the treating material, constituents may be introduced into the tower in such proportions that the adsorptive material and the sweetening material will be of substantially equal life, thereby reducing the cost of the treating material used.

The sweetening material need not be contained within the same tower with the adsorptive material. If desired, the sweetening material and the adsorptive material may be contained in separate chambers in which case the vapors will be passed through the chambers containing the sweetening material both before and after their passage through the chambers containing the adsorptive material.

Applicant has discovered that the yield of stable sweet product from cracked hydrocarbons for a given quantity of catalyst may be tremendously increased by contacting the cracked hydrocarbons with the catalyst under pressure. It is also possible by operating under elevated pressure to use a higher concentration of sweetening material and still get efficient action from the adsorptive catalyst than would be possible at atmospheric pressure. Advantage may be taken of this discovery in several ways. For instance, with a pressure cracking unit, the desired portion of the cracked hydrocarbons in vapor form may be brought directly into contact with the treating material at the cracking pressure or, if desired, the pressure may be elevated by means of a compressor. Otherwise, the cracked hydrocarbons may be supplied to the treating material in vapor form under pressure by use of any suitable compressor. The pressure used may range from the order of 100 pounds to the order of many hundred pounds depending upon the conditions involved.

The treating material, although preferably fuller's earth, may be any other adsorbent polymerizing agent which is capable of selectively polymerizing the objectionable, unstable, unsaturated compounds present in cracked petroleum products and in the claims, the words "adsorbent polymerizing agent" are intended to mean only such agents as have this characteristic of selective polymerization.

It is understood, of course, that, while the invention has been described in its particular application to the desulphurization of or sweetening and retaining of cracked petroleum products, the invention contemplates the treatment of any hydrocarbon contaminated with sulphur and simultaneously removing any other objectionable substances, compounds or materials which may be present therein.

This application is a continuation in part of my copending application Serial Number 91,665, filed March 2, 1926.

I claim:

1. The process of obtaining hydrocarbon products from hydrocarbon oil contaminated with sulphur or any of its compounds which comprises cracking the hydrocarbon oil, and contacting the desired portion of the cracked hydrocarbons in vapor form with an adsorbent polymerizing agent and with a sweetening material both before and after contact with the adsorbent polymerizing agent.

2. The process of obtaining hydrocarbon products from hydrocarbon oil contaminated with sulphur or any of its compounds which comprises cracking the hydrocarbon oil, and contacting the desired portion of the cracked hydrocarbons in vapor form with an adsorbent polymerizing agent and with a sweetening material both before and after contact with the main portion of said adsorbent polymerizing agent.

3. The process of obtaining hydrocarbon products from hydrocarbon oil contaminated with sulphur or any of its compounds which comprises cracking the hydrocarbon oil, passing the desired portion of the cracked hydrocarbons in vapor form through an adsorbent polymerizing agent and bringing said vaporized product into contact with a metallic oxide both before and after its passage through the main portion of the adsorptive catalyst.

4. The process of obtaining hydrocarbon products from hydrocarbon oil contaminated with sulphur which comprises cracking the hydrocarbon oil, passing the desired portion of the cracked hydrocarbons in vapor form through fuller's earth and contacting said hydrocarbons with a metallic oxide both before and after its passage through the main part of the fuller's earth.

5. The process of obtaining hydrocarbon products from hydrocarbon oil contaminated with sulphur which comprises cracking the hydrocarbon oil, passing the desired portion of the cracked hydrocarbons in vapor form through fuller's earth and contacting said hydrocarbons with copper oxide both before and after its passage through the main part of the fuller's earth.

6. The process of refining a hydrocarbon product obtained by cracking a hydrocarbon oil contaminated with sulphur which comprises passing the product in vaporous condition through an adsorbent polymerizing agent and contacting said product with sweetening material before and after its contact with the adsorbent polymerizing agent.

7. The process of refining a hydrocarbon product obtained by cracking a hydrocarbon oil contaminated with sulphur which comprises passing the product in vaporous condition through fuller's earth and contacting said product with sweetening material before and after its contact with the fuller's earth.

8. The process of refining a hydrocarbon product obtained by cracking a hydrocarbon oil contaminated with sulphur which comprises passing the product in vaporous condition through fuller's earth and contacting said product with a metallic oxide before and after its contact with the fuller's earth.

9. The process of refining a hydrocarbon product obtained by cracking a hydrocarbon oil contaminated with sulphur which comprises passing the product in vaporous condition through fuller's earth and contacting said product with copper oxide before and after its contact with the main part of the fuller's earth.

10. The process of obtaining hydrocarbon products from hydrocarbon oil contaminated with sulphur which comprises cracking the hydrocarbon oil, passing the desired portion of the cracked hydrocarbons in vapor form at superatmospheric pressure through an adsorbent polymerizing agent and contacting said cracked hydrocarbons with a metallic oxide both before and after it is passed through the adsorbent polymerizing agent.

11. The process of obtaining hydrocarbon products from hydrocarbon oil contaminated with sulphur which comprises cracking the hydrocarbon oil, passing the desired portion of the cracked hydrocarbons in vapor form at superatmospheric pressure through fuller's earth and contacting said cracked hydrocarbons with copper oxide both before and after it is passed through the fuller's earth.

12. The process of obtaining hydrocarbon products from hydrocarbon oil contaminated with sulphur which comprises cracking the hydrocarbon oil, passing the desired portion of the cracked hydrocarbons in vapor form through a metallic oxide, then through an adsorbent polymerizing agent and finally through a mixture of metallic oxide and adsorbent polymerizing agent.

13. The process of obtaining hydrocarbon products from hydrocarbon oil contaminated with sulphur which comprises cracking the hydrocarbon oil, passing the desired portion of the cracked hydrocarbons in vapor form through copper oxide, then through fuller's earth and finally through a mixture of copper oxide and fuller's earth.

14. The process of obtaining hydrocarbon products from hydrocarbon oil contaminated with sulphur which comprises cracking the hydrocarbon oil, passing the desired portion of the cracked hydrocarbons in vapor form at elevated pressure through a metallic oxide, then through an adsorbent polymerizing agent and finally through a mixture of metallic oxide and adsorbent polymerizing agent.

15. The process of obtaining hydrocarbon products from hydrocarbon oil contaminated with sulphur which comprises cracking the hydrocarbon oil, passing the desired portion of the cracked hydrocarbons in vapor form at elevated pressure through copper oxide, then through fuller's earth and finally through a mixture of copper oxide and fuller's earth.

16. The process of refining a hydrocarbon product obtained from a hydrocarbon oil contaminated with sulphur, which comprises passing the product in vaporous condition through sweetening material, adsorbent polymerizing agent and a mixture of sweetening material and polymerizing agent, the step of subjecting to the adsorbent polymerizing agent being intermediate of the other two steps.

17. The process of obtaining hydrocarbon products from hydrocarbon oil contaminated with sulphur or any of its compounds which comprises cracking the hydrocarbon oil, passing the desired portion of the cracked hydrocarbons in vapor form through an adsorbent polymerizing agent and bringing said vaporized product into contact with copper both before and after its passage through the main portion of the adsorbent polymerizing agent.

18. The process of obtaining hydrocarbon products from hydrocarbon oil contaminated with sulphur or any of its compounds which comprises cracking the hydrocarbon oil, passing the desired portion of the cracked hydrocarbons in vapor form through an adsorbent polymerizing agent and bringing said vaporized product into contact with a metallic salt both before and after its passage through the main portion of the adsorbent polymerizing agent.

THOMAS T. GRAY.

CERTIFICATE OF CORRECTION.

Patent No. 1,937,113.  November 28, 1933.

THOMAS T. GRAY.

It is hereby certified that error appears in the printed specification of the above numbered patent requiring correction as follows: Page 1, line 89, and page 2, line 4, for "absorptive" read adsorptive; page 2, line 137, claim 3, for "adsorptive catalyst" read adsorbent polymerizing agent; and that the said Letters Patent should be read with these corrections therein that the same may conform to the record of the case in the Patent Office.

Signed and sealed this 9th day of January, A. D. 1934.

F. M. Hopkins (Seal)  Acting Commissioner of Patents.